United States Patent
Basset et al.

(10) Patent No.: US 10,457,554 B2
(45) Date of Patent: Oct. 29, 2019

(54) CARBON NANOTUBES AND METHODS OF MAKING CARBON NANOTUBES

(71) Applicant: King Abdullah University of Science and Technology, Thuwal (SA)

(72) Inventors: Jean-Marie Basset, Thuwal (SA); Lu Zhou, Thuwal (SA); Youssef Saih, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/769,947

(22) PCT Filed: Oct. 19, 2016

(86) PCT No.: PCT/IB2016/056290
§ 371 (c)(1),
(2) Date: Apr. 20, 2018

(87) PCT Pub. No.: WO2017/068514
PCT Pub. Date: Apr. 27, 2017

(65) Prior Publication Data
US 2018/0312403 A1 Nov. 1, 2018

Related U.S. Application Data

(60) Provisional application No. 62/243,695, filed on Oct. 20, 2015.

(51) Int. Cl.
*C01B 32/162* (2017.01)
*B01J 23/745* (2006.01)
*B01J 21/04* (2006.01)
*B01J 21/18* (2006.01)
*B01J 35/00* (2006.01)
*B01J 37/08* (2006.01)
(Continued)

(52) U.S. Cl.
CPC .............. *C01B 32/162* (2017.08); *B01J 21/04* (2013.01); *B01J 21/185* (2013.01); *B01J 23/745* (2013.01); *B01J 35/0013* (2013.01); *B01J 37/084* (2013.01); *B82Y 30/00* (2013.01); *B82Y 40/00* (2013.01); *C01B 2202/36* (2013.01); *C01P 2004/03* (2013.01)

(58) Field of Classification Search
CPC .............. C01B 32/162; C01B 2202/36; C01B 2204/03; B01J 21/04; B01J 21/185; B01J 21/745; B01J 35/0013; B01J 37/084; B82Y 30/00; B82Y 40/00
See application file for complete search history.

(56) References Cited

PUBLICATIONS

Nhut, Jean-Mario, et al. "Mesoporous carbon nanotubes for use as support in catalysis and as nanosized reactors for one-dimensional inorganic material synthesis." Applied Catalysis A: General 254.2 (2003): 345-363.*

(Continued)

*Primary Examiner* — Richard M Rump
(74) *Attorney, Agent, or Firm* — Billion & Armitage; Lisbeth C. Robinson

(57) ABSTRACT

Embodiments of the present disclosure provide for methods that can be used to produce carbon nanotubes (hereinafter CNT) having an inner diameter about 5-55 nm, methods of tuning the inner diameter of CNTs (e.g., by adjusting reaction pressure), CNTs having an inner diameter of greater than 20 nm or more, and the like.

20 Claims, 3 Drawing Sheets

(51) Int. Cl.
*B82Y 30/00* (2011.01)
*B82Y 40/00* (2011.01)

(56) References Cited

PUBLICATIONS

Qian, Weizhong, et al. "Carbon nanotubes with large cores produced by adding sodium carbonate to the catalyst." Carbon 41.13 (2003): 2683-2686.*

Li, W. Z., et al. "Effect of gas pressure on the growth and structure of carbon nanotubes by chemical vapor deposition." Applied Physics A 73.2 (2001): 259-264.*

Xu, Chunbao, and Jesse Zhu. "One-step preparation of highly dispersed metal-supported catalysts by fluidized-bed MOCVD for carbon nanotube synthesis." Nanotechnology 15.11 (2004): 1671.* de Resende, Valdirene G., et al. "Synthesis of γ-(Al 1-x Fe x) 2 O 3 solid solutions from oxinate precursors and formation of carbon nanotubes from the solid solutions using methane or ethylene as carbon source." Journal of Materials Research 23.11 (2008): 3096-3111.*

Search Report and Written Opinion for PCT/IB2016/056290 dated Nov. 30, 2016.

Corrias, "Nouvelle Classede catalyseurs pour la production massive en lit fluidise de nanotubes de carbone multi parois", URL:http://ethesis.inp-toulouse.fr/archive/0001686/, Sep. 27, 2011, 111-164.

Huang, et al., "Synthesis of rigid and stable large-inner-diameter multiwalled carbon nanotubes", RCS Advances, vol. 2, 212. No. 2, Jan. 25, 2012, pp. 2685-2687.

Serp, et al., "Carbon nanotubes and nanofibers in catalysis", Applied Catalysis A: General, vol. 253, No. 2, Oct. 28, 2003, pp. 337-358.

Singh, et al., "High density of multiwalled carbon nanotubes observed on nickle electroplated copper substrates by microwave plasma chemical vapor deposition", Chemical Physics Letters, vol. 354, 2002 pp. 331-336.

Wei, et al., "The mass production of carbon nanotubes using a nano-agglomerate fluidized bed reactor: A multiscale space-time analysis", Powder Technology, vol. 183, Nov. 24, 2002, pp. 10-20.

* cited by examiner

CARBON NANOTUBES AND METHODS OF MAKING CARBON NANOTUBES

CROSS-REFERENCE TO RELATED APPLICATIONS

This application claims the benefit of and priority to U.S. Provisional Application Ser. No. 62/243,695, having the title "CARBON NANOTUBES AND METHODS OF MAKING CARBON NANOTUBES," filed on Oct. 20, 2015, the disclosure of which is incorporated herein in by reference in its entirety.

BACKGROUND

CNT has been the research focus over a decade due to its unusual properties, which are valuable for nanotechnology, electronics, optics and other fields of materials science and technology. In particular, owing to their extraordinary thermal conductivity and mechanical and electrical properties, CNT finds applications as additives to various structural materials.

Presently, CNT can be produced in large quantities by these following dominant techniques: chemical vapor deposition, high-pressure carbon monoxide process, arc discharge, and laser ablation. Hydrocarbons decomposition over Ni, Fe, or Co catalysts has been recently investigated by some researchers to produce CNT. It has been reported that multiwalled CNT with inner diameters 5 nm to 10 nm can be formed during ethylene decomposition at 700° C., atmospheres pressure over Co and Fe catalysts. In addition, multi-walled carbon nanotubes have been produced that have 5 to 20 nm inner diameter and 60 to 413 nm in length, which were synthesized over nickel supported on a zeolite by the decomposition of methane in the relatively low temperature range 400-550° C. Nevertheless, almost all produced CNTs have an inner diameter from 5-20 nm.

SUMMARY

Embodiments of the present disclosure provide for methods that can be used to produce carbon nanotubes (hereinafter CNT) having an inner diameter about 5-50 nm, methods of tuning the inner diameter of CNTs (e.g., by adjusting reaction pressure), CNTs having an inner diameter of greater than 20 nm or more, and the like.

In an embodiment, a method for hydrocarbon catalytic decomposition; among others, includes: heating a catalyst to about 400 to 1000° C. under an inert gas; flowing a hydrocarbon across the catalyst; and decomposing the hydrocarbon to produce carbon nanotubes (CNTs) having an inner diameter of about 5 to 55 nm. In an embodiment, the inner diameter is about 25 to 55 nm and an outer diameter of about 10 to 130 nm. In an embodiment; the hydrocarbon can be methane. In an embodiment, the catalyst can be a supported fused Fe catalyst (e.g., a fused $Fe/Al_2O_3$ catalyst). An embodiment of the method may also include: heating the supported fused Fe catalyst to the reduction temperature of the supported fused Fe catalyst; and flowing $H_2$ over the supported fused Fe catalyst to reduce the supported fused Fe catalyst. In an embodiment, the method can also include: adjusting a reaction pressure to select the inner diameter of the CNT. In an embodiment, the reaction pressure is about 5 to 50 bar.

In an embodiment, a composition, among others, includes: a CNT having an inner diameter of about 25 to 55 nm. In an embodiment, the CNT can have an outer diameter of about 10 to 130 nm.

In an embodiment, a hydrocarbon catalytic decomposition system, among others, includes: a carbon nanotube (CNT) having an inner diameter of about 25 to 55 nm that replaces commercial catalyst supports.

Other compositions, systems, methods, features, and advantages will be or become apparent to one with skill in the art upon examination of the following drawings and detailed description. It is intended that all such additional compositions, systems, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

Figure 1:
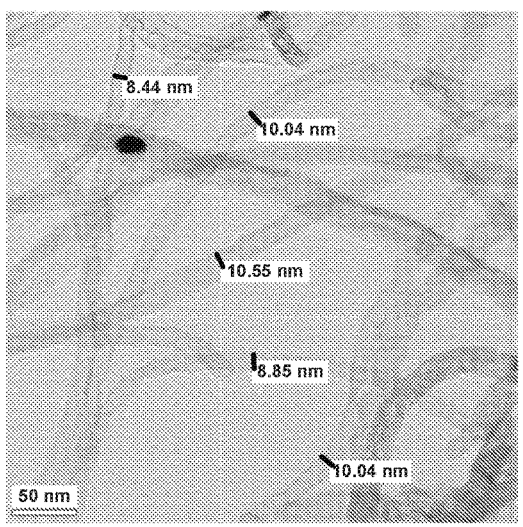
FIG. 1 shows carbon nanotubes produced at 1 bar.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, inorganic chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

General Discussion

Embodiments of the present disclosure provide for methods that can be used to produce carbon nanotubes (hereinafter CNT) having an inner diameter about 5-55 nm, methods of tuning the inner diameter of CNTs (e.g., by adjusting reaction pressure), CNTs having an inner diameter of greater than 20 nm or more, and the like. In particular, embodiments of the present disclosure provide for methods to produce CNTs having large inner diameters through hydrocarbon catalytic decomposition. In addition, embodiments of the present disclosure provide for the ability to tune the CNT inner pore size by changing the hydrocarbon decomposition conditions (e.g., reaction pressure).

CNTs having a large inner diameter (e.g., high inner pore volume) may be valuable in areas such as biology, catalysis, and material science. For example, CNTs can be used in biological applications to provide large channels for biomimetic platforms for developing cell interfaces. In catalysis CNTs having a large inner diameter have a crystallinity that can allow single site catalysis. In an embodiment, the CNTs can be used as catalyst supports to replace commercial supports (e.g., MCM41).

Embodiments of the present disclosure use a catalyst (e.g., a fused Fe catalyst) to produce CNTs with tunable inner pore sizes (e.g., diameters), In an embodiment, the CNT can have an inner diameter of about 5 to 55 nm and an outer diameter of about 10 to 130 nm, where for both the inner and outer diameter, any range between and including about 5 to 55 nm and about 10 to 130 nm, respectively, is intended to be included in about 1 nm or more increments in those ranges.

Methods of the present disclosure can use reaction conditions to tune the method to produce CNTs having desired dimensions including control to produce a desired inner diameter. In an embodiment, the method can be used to produce CNTs having an inner diameter of about 5 nm, about 10 nm, about 20 nm, about 22 nm, about 24 nm, about 26 nm, about 28 nm, about 30 nm, about 35 nm, about 40 nm, or about 45 nm to about 10, about 20 nm, about 25 nm, about 30 nm, about 35 nm, about 40 nm, about 45 nm, about 50 nm, or about 55 nm, where all possible integer values including and within the various inner diameter values is contemplated (e.g., about 22 to 55 nm, about 30 to 45 nm, about 10 to 30 nm, and the like).

Embodiments of the present disclosure can use catalysts made from inert oxides (e.g., $Al_2O_3$, silica, silica-alumina, zirconia, titania, zinc oxide, magnesia, zeolite, mesoporous zeolite, $CeO_2$, and/or $SiO_2$ that support one or more a combination of Fe, Ni, Cu, Co, Ru, Rh, Pt, or Pd, or the like). In an embodiment, the catalyst is a fused Fe catalyst (e.g., a fused Fe—$Al_2O_3$ catalyst). The fused Fe catalyst can be used for the industrialization of methane catalytic decomposition processes, which form the CNTs as well as other gases (e.g., $H_2$). In particular, the supported fused Fe catalyst is a fused Fe/$Al_2O_3$ catalyst. In an embodiment, the Fe content in the supported fused Fe catalyst can be about 5 to 65 wt % of the supported fused Fe catalyst. In an embodiment, the alumina support can be replaced with one or more of the following: silica, silica-alumina, zirconia, titania, zinc oxide, magnesia, zeolite, mesoporous zeolite, and the like, and a combination thereof.

An embodiment of the method can use a hydrocarbon as the source for decomposition to produce CNTs. In an embodiment, the hydrocarbon can include saturated and unsaturated hydrocarbons such as C1-C20 alkanes, C2-C20 alkenes, C2-C20 alkynes, and a mixture thereof, where each can be linear, branched, cyclic, aromatic, or a mixture thereof. In an embodiment, the hydrocarbon can be 100% pure hydrocarbon, a mixtures of hydrocarbons at various concentrations, or a mixture with another gas(es) that does not interfere with the production of the CNTs. In an embodiment, the hydrocarbon can be methane.

In the following illustrative embodiment, the hydrocarbon is methane, but other hydrocarbons or mixtures can be used. In an embodiment, the catalytic reaction to produce the CNTs can be conducted in a PID microreactor or similar reactor equipped with a long stainless tube reactor (e.g., ID 9 mm, length 305 mm), which can be heated by a furnace (e.g., an electrical furnace) under a pressure of about 1 to 50 bar and a temperature of about 550 to 900° C., where the pressure and temperature can be adjusted to produce CNTs having a desired inner diameter and other dimensions. The catalyst was loaded into the reactor, while the reaction temperature was controlled by a thermocouple placed into the middle of the catalyst layer. The loaded catalyst was directly heated to the reaction temperature under an inert gas (e.g., Ar gas), and then the gas was switched to methane to begin the methane decomposition reaction for a time frame of about 10 min to 10 h. The reaction produces CNTs and other gases (e.g., $H_2$). Additional details regarding the decomposition of the hydrocarbon are provided in the Example.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

The present example discloses a method that is used to prepare CNT with inner diameter ranged from about 5-55 nm through hydrocarbons decomposition at selected conditions. The present example further discloses a relationship between the pore size and reaction conditions.

Materials and General Consideration:

Unless otherwise stated, all reagents were purchased from commercial suppliers and used as received. The hard reduced oxides like $Al_2O_3$, $CeO_2$, $SiO_2$ and etc. supported Fe, Ni, Cu, Co, Ru, Rh, Pt, Pd and etc. catalysts are effect for this methane decomposition. In this present example, the methane decomposition over alumina supported iron catalyst (hereinafter $Fe/Al_2O_3$) is selected as the representative example. Iron nitrate nonahydrate (98%) and aluminum nitrate nonahydrate (99.997%) were purchased from Sigma-Aldrich and used as received. $Fe/Al_2O_3$ can be synthesized by several methods including impregnation, sol-gel, precipitation and so on. In the present example, $Fe/Al_2O_3$ materials were prepared according to the procedure named as fusion method; a typical procedure is described as follows:

- Physically grinding and mixing Fe nitrate and support nitrate
- Calcining under static air from R.T. to 350° C. for 3 h with a 5° C./min
- Going down to RT under air flow, and then grinding the final sample to fine powder Its Fe loading ranges from 5-65 wt. %, as determined by elemental analysis. Some catalysts properties are shown in Table 1.

Elemental analyses were obtained from the service of Mikroanalytisches Labor Pascher (Remagen, Germany). XRD patterns were recorded on a Bruker D8 Advanced A25 diffractometer using a Bragg-Brentano geometry with a copper tube operating at 40 kV and 40 mA. $N_2$ adsorption-desorption isotherms were obtained on a Micromeritics ASAP2420. Prior to these measurements, the samples were degassed for 2 h at 300° C. The surface areas of the samples were determined by a multi-point BET analysis method, and pore volumes were estimated at $P/P_0=0.99$. Scanning electron microscope (SEM) images were taken by the FEI Quanta 200 or 600 FEG environmental scanning electron microscope (ESEM). TEM images were taken on a Titan G2 transmission electron microscope (FEI, Hillsboro, Oreg., USA), operating at 80-300 kV and equipped with a 4 k×4 k charge-coupled device (CCD) camera (US4000) and energy filter (GIF Tridiem, Gatan Inc., Pleasanton, Calif., USA). The specimens were prepared by ultrasonically suspending the sample in ethanol. A drop of the suspension was then applied onto clean holy copper grids and dried in air.

TABLE 1

Properties of catalysts A to G

| Catalysts | Fe loading [wt %] | BET [m2/g] | Pore volume [cc/g] | Pore size [nm] |
|---|---|---|---|---|
| A | 5 | 145 | 0.15 | 3.68 |
| B | 10 | 162 | 0.16 | 3.47 |
| C | 20 | 203 | 0.24 | 4.07 |
| D | 35 | 184 | 0.23 | 4.00 |
| E | 40 | 174 | 0.26 | 4.83 |
| F | 50 | 116 | 0.19 | 5.07 |
| G | 65 | 57 | 0.20 | 11.77 |

In an embodiment, any hydrocarbon can be selected as the source for decomposition to produce CNT. In this present example, the methane decomposition was selected as the representative example of hydrocarbon. A typical methane decomposition test is described as follows: The catalytic reaction was conducted in a PID micro reactor equipped with a long stainless tube reactor (ID 9 mm, length 305 mm), which was heated by an electrical furnace under different pressure from 1 to 50 bar and different temperatures from 550 to 900° C. In this present example, the 750° C. was selected as the representative reaction temperature, while the catalyst E was selected as the representative sample. The catalyst was loaded into the reactor, while the reaction temperature was controlled by a thermocouple placed into the middle of the catalyst layer. The $CH_4$ used for the MCD can be at any concentration. In this present example, a pure methane gas was used. The loaded catalyst was directly heated to reaction temperature under Ar gas, and then the gas was switched to $CH_4$ to begin the methane decomposition reaction. The outlet gases were analyzed by an online GC (Varian 450-GC) and micro GC (Soprane MicroGC 3000).

The reaction results are summarized in Table 2.

TABLE 2

Summarization of the methane decomposition results over catalysts

| Catalysts | Reaction temp. [° C.] | Reaction GHSV [L/h · $g_{cat}$] | Reaction Pressure [bar] | CNT inner pore size [nm] |
|---|---|---|---|---|
| E | 750 | 7.5 | 1 | 8-10 |
| E | 750 | 7.5 | 2 | 8-10 |
| E | 750 | 7.5 | 5 | 15-22 |
| E | 750 | 7.5 | 10 | 25-29 |
| E | 750 | 7.5 | 30 | 42-50 |
| E | 750 | 7.5 | 50 | 46-52 |

Figure 2:
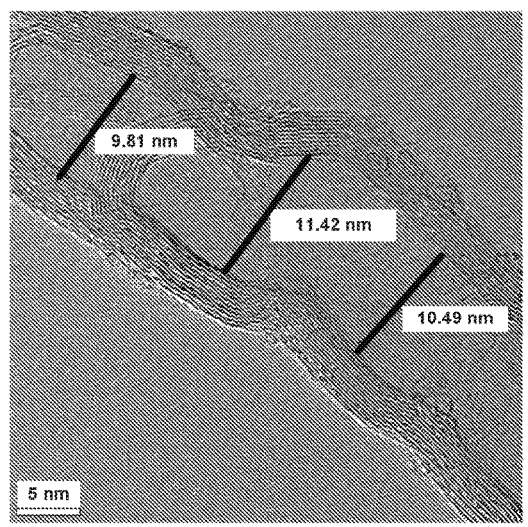
FIG. 2 shows carbon nanotubes produced at 2 bar.
Figure 3:
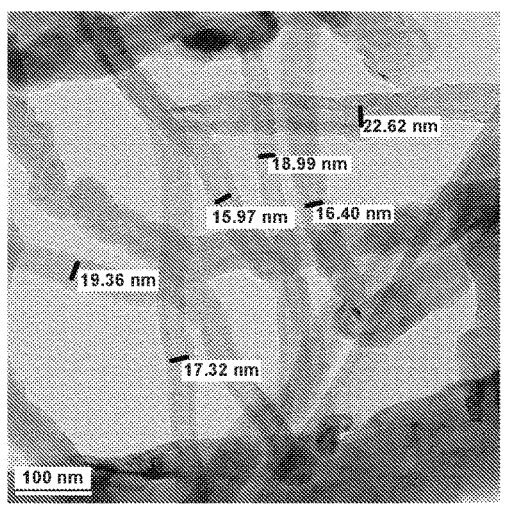
FIG. 3 shows carbon nanotubes produced at 5 bar.
Figure 4:
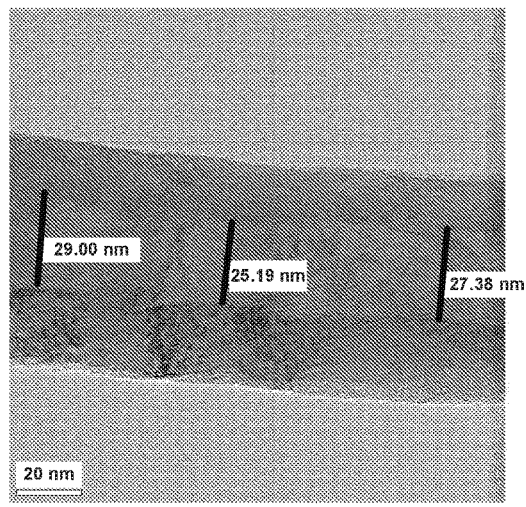
FIG. 4 shows carbon nanotubes produced at 30 bar.
Figures 5, 6:
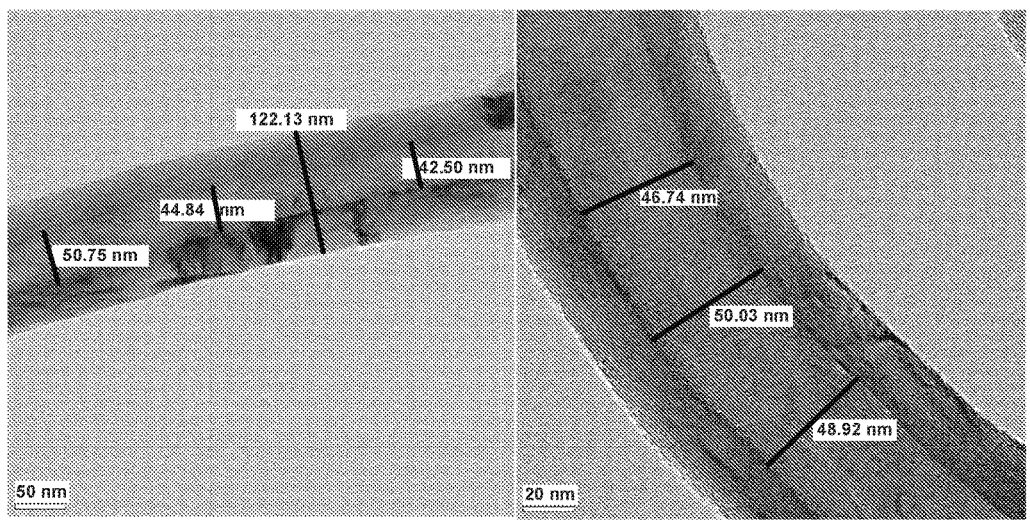
FIG. 5 shows carbon nanotubes produced at 30 bar.
FIG. 6 shows carbon nanotubes produced at 50 bar.

The CNT size of different samples in Table 2 was confirmed with TEM in FIGS. 1-6.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a

We claim at least the following:

1. A method for hydrocarbon catalytic decomposition, comprising:
   heating a catalyst to about 400 to 1000° C. under an inert gas;
   flowing a hydrocarbon across the catalyst;
   decomposing the hydrocarbon to produce carbon nanotubes (CNTs) having an inner diameter of about 5 to 55 nm; and adjusting a reaction pressure to select the inner diameter of the CNTs;
   wherein the reaction pressure is adjusted within a range of about 5 to about 50 bar.

2. The method of claim 1, wherein an outer diameter of the CNTs is within a range of about 10 to 130 nm.

3. The method of claim 1, wherein the catalyst is a supported fused Fe catalyst, wherein flowing a hydrocarbon across the supported fused Fe catalyst reduces the supported fused Fe catalyst.

4. The method of claim 3, wherein the supported fused Fe catalyst is a fused $Fe/Al_2O_3$ catalyst.

5. The method of claim 1, wherein the catalyst is a supported fused Fe catalyst, and further comprising:
   flowing $H_2$ over the heated catalyst to reduce the supported fused Fe catalyst before flowing the hydrocarbon.

6. The method of claim 1, wherein the catalyst is a reduced oxide.

7. The method of claim 1, wherein the reaction pressure is about 5 bar.

8. The method of claim 7, wherein the inner diameter is about 15 to 22 nm.

9. The method of claim 1, wherein the reaction pressure is about 10 bar.

10. The method of claim 9, wherein the inner diameter is about 25 to 29 nm.

11. The method of claim 1, wherein the reaction pressure is about 30 bar.

12. The method of claim 11, wherein the inner diameter is about 42-50 nm.

13. The method of claim 1, wherein the reaction pressure is about 50 bar.

14. The method of claim 13, wherein the inner diameter is about 46-52 nm.

15. The method of claim 3, wherein the Fe content in the supported fused Fe catalyst is about 5 to 65 wt % of the supported fused Fe catalyst.

16. The method of claim 1, wherein the catalyst is heated to a temperature within a range of about 550 to 900° C.

17. The method of claim 1, wherein the hydrocarbon is a C1-C20 alkane or C2-C20 alkene.

18. The method of claim 17, wherein the hydrocarbon is methane.

19. The method of claim 15, wherein the hydrocarbon is flowed at a Gas Hourly Space Velocity (GHSV) of 7.5 L/h·g catalyst.

20. The method of claim 3, wherein the support of the supported fused Fe catalyst is selected from the group consisting of alumina, silica, silica-alumina, zirconia, titania, zinc oxide, magnesia, zeolite, mesoporous zeolite, and a combination thereof.

* * * * *